No. 799,973. PATENTED SEPT. 19, 1905.
N. D. CHARD & W. LODGE.
SPEED CONTROL FOR MACHINE TOOLS.
APPLICATION FILED JAN. 3, 1905.
2 SHEETS—SHEET 1.
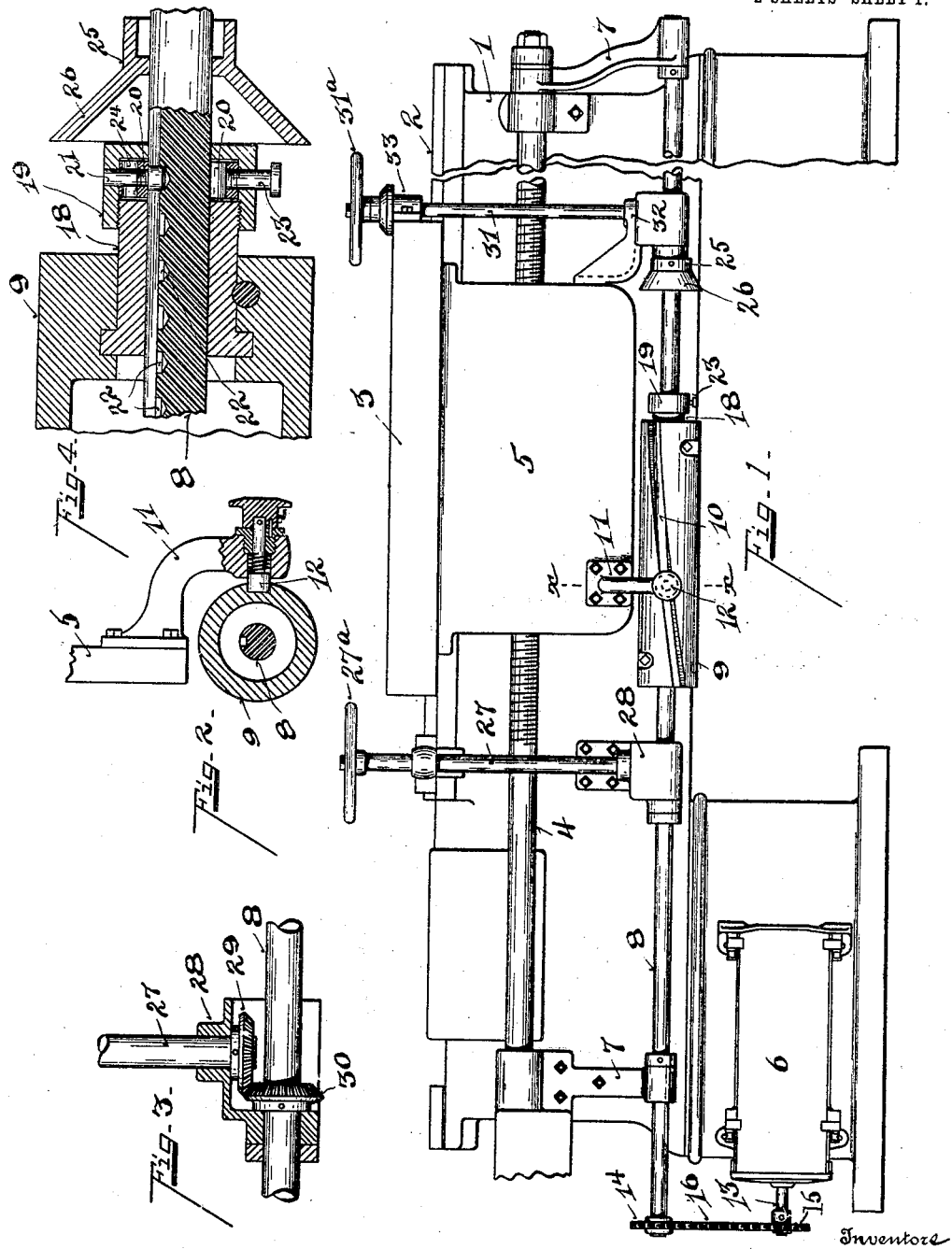

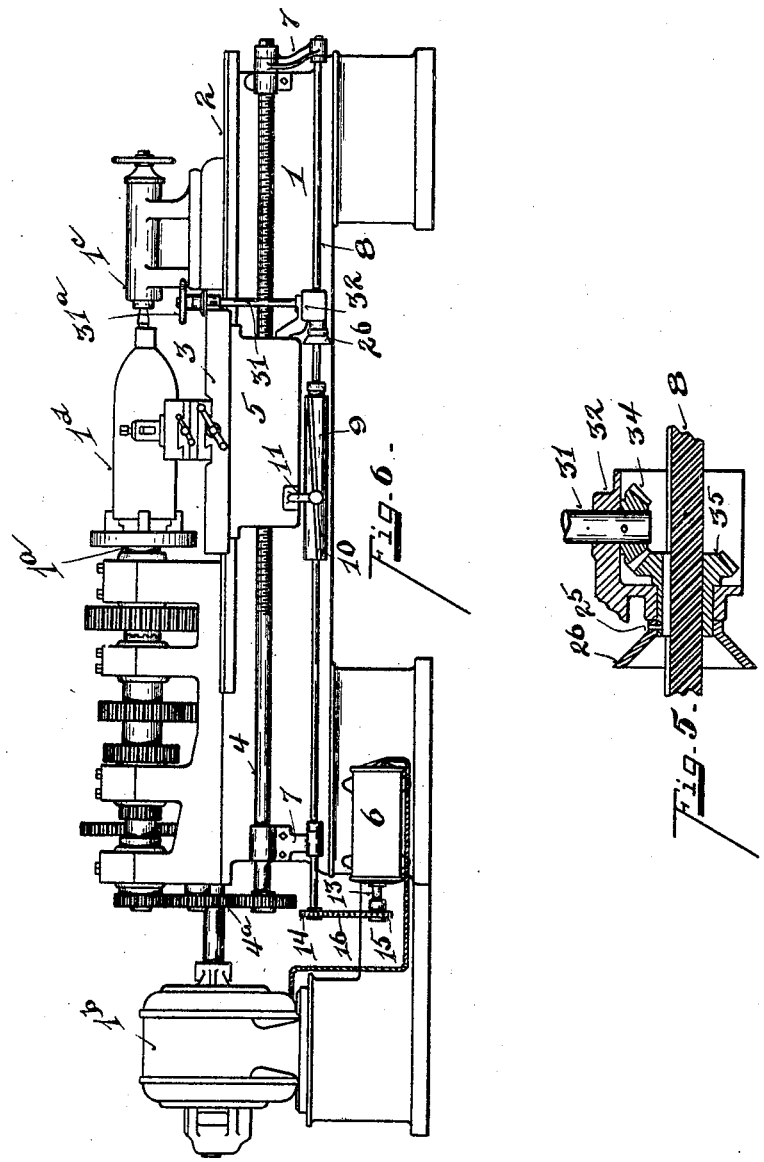

UNITED STATES PATENT OFFICE.

NICHOLAS D. CHARD AND WILLIAM LODGE, OF CINCINNATI, OHIO, ASSIGNORS TO THE LODGE & SHIPLEY MACHINE TOOL COMPANY, OF CINCINNATI, OHIO, A CORPORATION.

SPEED CONTROL FOR MACHINE-TOOLS.

No. 799,973.    Specification of Letters Patent.    Patented Sept. 19, 1905.

Application filed January 3, 1905. Serial No. 238,494.

*To all whom it may concern:*

Be it known that we, NICHOLAS D. CHARD and WILLIAM LODGE, citizens of the United States, residing at Cincinnati, in the county of Hamilton and State of Ohio, have invented certain new and useful Improvements in Speed Control for Machine-Tools, of which the following is a specification.

Our invention relates to a machine organization employing a rotary member and a rectilineal moving member driven from a common source, the object being to provide in combination therewith mechanism automatically actuated by the longitudinally-moving member to change the speed of rotation of the rotary member. This is useful in machine-tools wherever it may be desirable to change the speed of the rotary member relative to the carriage travel while operating upon a given job, the gradations of cutting speed being produced by the moving carriage.

Our invention particularly and as exemplified by the drawings is applied to an engine-lathe in which the tool-holding carriage causes a gradation of spindle-speed, whereby a given job is subjected to varying cutting speeds selected to best satisfy the character of the work.

Our invention also provides means for cutting out the automatic arrangement and controlling the speed by hand devices located on the carriage.

Our invention also provides means for automatically throwing out the automatic speed-controlling mechanism at a predetermined point of carriage travel.

The features of our invention are more fully set forth in the description of the accompanying drawings, forming a part of this specification, in which—

Figure 1 is a front elevation of a lathe-bed with our improved speed-controlling mechanism in position. Fig. 2 is an enlarged section on line *x x*, Fig. 1. Fig. 3 is an enlarged section of the transmitting elements of the hand-feed secured to the lathe-bed. Fig. 4 is a horizontal section, enlarged, of the mechanism for engaging and disengaging the cam-sleeve from its motor-control feed-shaft. Fig. 5 is an enlarged section of the transmitting elements of the hand-feed secured to the lathe-carriage. Fig. 6 is a front elevation of a lathe, illustrating motor, work, &c., in position for use.

The invention is particularly applicable to such special jobs as turning a projectile, where the tool is caused by suitable mechanism (not shown) to travel in a curved or tapered path between lathe-centers over a constantly-changing diameter of work. It is obvious that to get the highest efficiency a lathe-spindle should rotate the work at a higher speed when the tool is dressing lesser diameters than when the tool is dressing the greater diameters of work in order to maintain a uniform travel in feet per minute of the work against the tool. With our invention say a curved shell or projectile is to be turned which is clamped between centers with the tapered end held by the tail-stock center. The tool is started in at the tapered end at a given speed, relatively high, to give the best results, while the tool is turning the smaller diameter portion of the shell.

Our invention has for its chief object the production of a mechanism which will be actuated by the advancing carriage to automatically decrease the speed gradually and in inverse ratio to the gradually-increasing diameter of the work being operated upon by the tool.

1 represents the lathe-bed, upon the rails 2 of which travels the carriage 3.

$1^a$ represents the spindle; $1^b$, the motor for driving the same.

$1^c$ represents the tail-stock.

$1^d$ represents the projectile clamped between centers.

4 represents the usual feed-shaft or lead-screw, which drives suitable mechanism in the carriage-apron 5 for converting the rotary into rectilineal motion, and thus propelling the carriage.

$4^a$ represents the transmission elements between the live-spindle and lead-screw.

The invention is chiefly applicable to an electrically-driven tool having the usual speed-controlling box 6 to furnish a variety of speeds to the lathe-spindle. From the lead-screw 4 are suspended the brackets 7, on the ends of which are journaled a speed-controlling shaft 8. Upon the shaft 8 is a sleeve 9, having a camway formed in its outer periphery. The spirality of the camway shown is gaged so as to produce a desired turn of the shaft 8 relative to the increasing diameter of a given standard piece of work to be turned. This sleeve 9 is adapted to be fixed to the shaft 8. Suspended from the apron 5 is a bracket 11, having a dog or pin 12, adapted to be engaged into the spiral camway 10.

13 represents the shaft of the speed-box 6, which operates the speed-shifting mechanism of whatever specific character.

Shafts 8 and 13 are provided with sprocket-wheels 14 15, connecting by sprocket-chain 16.

It is obvious that when sleeve 9 is fixed to shaft 8 and the carriage is in motion the dog 12, traveling longitudinally in the plane of the sleeve 9 and shaft 8, will by its engagement with the spiral camway 10, rotate the speed-controlling shaft 8, and thereby automatically actuate the speed-controlling device.

Of course any variation of speed may be obtained by the formation of the camway, so that the speed will be changed in any given ratio relative to the longitudinal travel of the carriage.

We provide the following connecting devices between the shaft 8 and the sleeve 9, (see Fig. 4:) 18 represents a sleeve intermediate shaft 8 and sleeve 9 and pinned to sleeve 9. 19 represents a collar screw-threaded upon the end of the sleeve 18, leaving a chamber between the ends of the sleeve 18 and collar 19. Within this chamber is a ring 20 of greater diameter than the shaft 8. Into this ring 20 is screw-threaded a pin 21, the stem of which pin passes through an orifice in the collar 19, serving to guide the ring and pin in the chamber to and from the series of indents 22 in the shaft 8. 23 represents another pin, screw-threaded into the ring 20 opposite pin 21, the stem of which passes through an orifice in the opposite side of the collar 19. The head of the pin 23 extends outside of the collar 19. A spring 24 in the chamber engages against the ring 20 and holds it normally eccentric with shaft 8, as shown in Fig. 4, with the pin 21 engaging one of the detents 22 of shaft 8 and the head of pin 23 projected from collar 19. 25 represents a sleeve fixed to a gear in a journal-bracket 32, secured to the carriage and traveling with the carriage, and therefore moves longitudinally back and forth on shaft 8. Housing 25 is provided with a funnel-shaped cam 26, the mouth of which is adapted to pass over the end of the collar 19, thereby bringing the inner tapering periphery of this funnel into engagement with the head of the pin 23, lifting pin 23 and ring 20, compressing spring 24, raising pin 21 from the indent 22, and so unlocking sleeve 19 from shaft 8. It is evident that this operation will occur when the carriage brings the funnel 26 over the end of the collar 19. It is also evident that when said funnel 26 is retracted by the return movement of the carriage the spring 24 will automatically depress the ring 20 and lock the pin 21 into one of the indents 22 on shaft 8. It is also obvious that with this means the sleeve 9 may be adjusted along the controlling-shaft 8 so as to be fixed thereto at selected positions along the lathe-bed.

In order to control the feed by hand, we provide an operating-shaft 27 and handle 27ᵃ on the lower end of this shaft journaling in a casing 28, through which pass at right angles the operating-shaft 27 and the speed-controlling shaft 8, as shown in Fig. 3, the shaft 27 having a bevel gear-wheel 29 intermeshing with the bevel gear-wheel 30, fixed to shaft 8. This hand controlling-shaft is a matter of considerable convenience. Also for convenience we place a hand controlling-shaft on the carriage, which travels with the carriage and can be operated while the carriage is in motion. This shaft 31 is secured to the carriage by journal-brackets 32 33 and is provided with a hand-wheel 31ᵃ. Within the housing of the bracket 32 are bevel gear-wheels 34 35 for transmitting rotary movement from shaft 31 to shaft 8. The bevel gear-wheel on shaft 8 is splined thereto. It is obvious that these hand-wheels can only be operated when the sleeve 9 is disconnected from the shaft 8.

As shown in Fig. 2, the dog 12 can be retracted from engagement with the spiral cam, thereby leaving the sleeve 9 free from the impulse of the carriage, and the hand controls can then be used as desired.

Having described our invention, we claim—

1. In a machine of the class described, a bed, a rotatable work-holder, means for rotating said work-holder, a variable-speed device for controlling said means, a reciprocable tool-holding carriage on the bed, means for converting the rotary movement of the work-holder into rectilineal carriage movement, a speed-controlling shaft supported parallel to the line of carriage travel, connections between said speed-controlling shaft and the variable-speed device adapted to control the speed of the latter, a spirally-grooved cam-sleeve on said speed-controlling shaft, means on the carriage engaging the groove of the cam to rotate said shaft, means for clutching and unclutching said sleeve to said shaft, and a trip mechanism on the carriage adapted to automatically unclutch said sleeve at a predetermined point in the carriage travel, substantially as described.

2. In a machine of the class described, a bed, a rotatable work-holder, means for rotating said work-holder, a variable-speed device for controlling said means, a reciprocable tool-holding carriage on the bed, means for converting the rotary movement of the work-holder into rectilineal carriage movement, a speed-controlling shaft supported parallel to a line of carriage travel, connections between said speed-controlling shaft and the variable-speed device, adapted to control the speed of the latter, a spiral cam-sleeve on said controlling-shaft, means on the carriage engaging the groove of the cam, to rotate said shaft, and means for clutching and unclutching said sleeve, substantially as described.

3. In a lathe, a bed, live and dead spindles, carriage-ways on the bed, parallel with said spindles, a carriage, means for rotating the live-spindle, a variable-speed mechanism for controlling said driving means, a controlling-shaft supported by the bed, parallel with the line of carriage travel, a cam on said shaft, a device on the carriage engaging said cam, and transmitting devices between the said controlling-shaft and variable mechanism, substantially as described.

4. In an electric-driven lathe, a bed, live and dead spindles, carriage-ways and carriage, transmitting devices between the live-spindle and carriage, a motor for driving the live-spindle, a rheostat for controlling the speed of the motor, an actuating device for the rheostat, a shaft supported parallel to the line of carriage travel, formed with a cam, an engaging device on the carriage for said cam, whereby the carriage in its travel between centers, rotates the shaft, and transmission elements between the said shaft and the rheostat-actuating device, substantially as described.

In testimony whereof we have hereunto set our hands.

NICHOLAS D. CHARD.
WILLIAM LODGE.

Witnesses:
OLIVER B. KAISER,
LUISE BECK.